May 18, 1926.
T. SWANSON
EXPANSION JOINT AND RIBBON EDGER
Filed Feb. 25, 1925    2 Sheets-Sheet 1
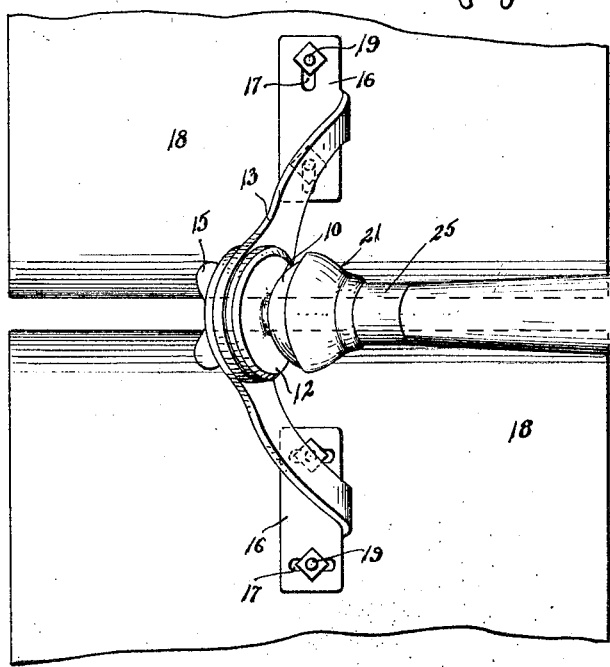
T. Swanson,
INVENTOR
BY *Victor J. Evans,*
ATTORNEY
WITNESS:

May 18, 1926.
T. SWANSON
1,585,571
EXPANSION JOINT AND RIBBON EDGER
Filed Feb. 25, 1925
2 Sheets-Sheet 2
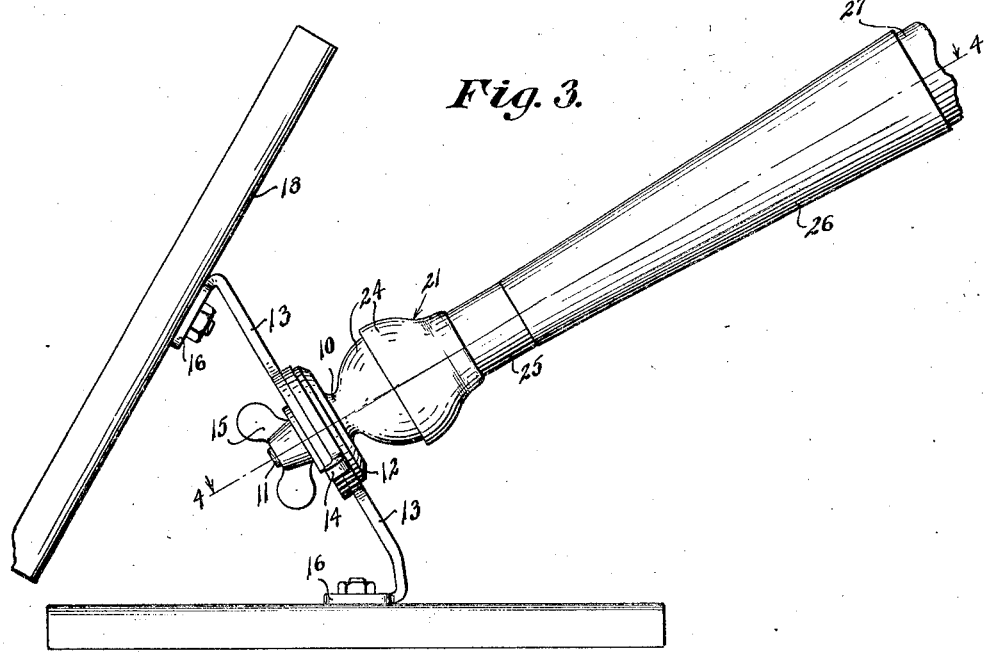
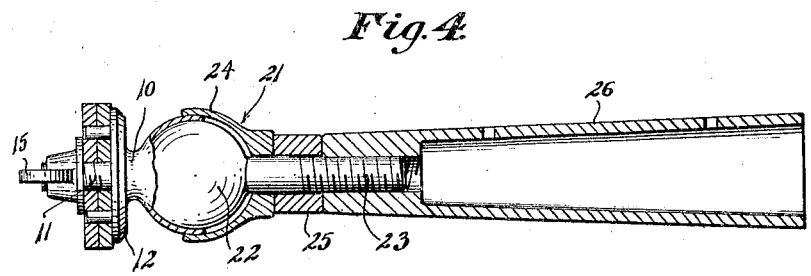
T. Swanson,
INVENTOR
BY Victor J. Evans,
ATTORNEY
WITNESS:

Patented May 18, 1926.

UNITED STATES PATENT OFFICE.

THORSTEN SWANSON, OF HOQUIAM, WASHINGTON.

EXPANSION JOINT AND RIBBON EDGER.

Application filed February 25, 1925. Serial No. 11,595.

This invention relates to tools intended for use by cement workers and others and has for its object the provision of a combined expansion joint and ribbon edger, the device being capable of use for smoothing off the edges at expansion joints in highway and sidewalk construction in such a manner that both sides of the joint will be at the same height, the device being furthermore adjustable so that it may be used for smoothing off the edge of a strip of cement, concrete or the like.

An important object is the provision of a device of this character which embodies movably mounted elements provided with means whereby to effect holding thereof at any desired adjusted position depending upon the nature of the work to be done by the tool, the device being moreover equipped with a universally mounted handle whereby the active element of the tool may be permitted to remain in their proper operative relation to the surface being worked upon regardless of the angle at which the handle may be held.

An additional object is the provision of a device of this character which will be simple and inexpensive in manufacture, easy to adjust or convert for one use or another, and which will moreover be efficient and durable in service and a general improvement in the art.

With the above and other objects and advantages in view, the invention consists in the details of construction to be hereinafter more fully described and claimed, and illustrated in the accompanying drawings, in which:

Figure 1 is an elevation of the device showing it for use as an expansion joint edger, Figure 2 is a top plan view thereof, Figure 3 is a side elevation of the device showing the parts arranged for use as a ribbon edger, and Figure 4 is a detail section on the line 4—4 of Figure 3.

Referring more particularly to the drawings, I have shown the device as comprising a head 10 formed or provided with a reduced threaded extension 11 which may be considered as constituting a shank, the head being formed with an enlarged portion 12 adjacent the extension.

Pivotally mounted upon the extension or shank 11 is a pair of arms 13 which are similar in construction and curved in shape, these arms being formed with their laterally extending lugs 14 coacting with the edges of the arms for limiting their pivotal movement in one direction. These arms are of course adjustable upon the extension 11 and ordinarily they are held in any desired position by means of a suitable clamping nut 15 screwed into the extension 11 and firmly clamping the arms against the enlarged portion 12 of the head. At their other ends, or the ends most remote from the pivot, the arms terminate in attaching feet 16 formed with elongated slots 17 for a purpose to be described.

The tool further includes a pair of relatively large flat blades 18 secured to the attaching feet 16 by means of suitable bolts 19 passing through the blades and through the elongated slots 17 in the feet. The adjacent edges of the blades are curved downwardly as indicated at 20 and are intended to be spaced slightly apart, the difference between them being governed by the adjustment of the plate with respect to the attaching feet 16, the provision of the slots 17, above described, permitting the adjustment.

While any suitable handle means might be provided, I preferably make use of the swivel or universal joint construction illustrated and designated broadly at 21, this feature of the device including a ball member 22 rotatably engaged within the partially spherical head 10 and formed with a reduced threaded extension 23 on which is mounted a partially spherical shell member 24 embracingly engaging about the open portion of the head 10. Disposed on the reduced threaded extension 23 is a sleeve or washer 25 and threaded on to the extension is an elongated socket member 26 which is screwed tightly in place against the sleeve 25 so that the latter coacting with the shell member 24 will operate to hold the parts in proper position and against accidental displacement. Any suitable pole 27 or the like may be engaged within the socket member 26, the length being immaterial and depending to a certain extent upon the nature of the work to be done by the tool.

When it is intended to use the device for edging an expansion joint in pavements or sidewalk construction, it is intended that the nut 15 be loosened so that the arms 13 may be swung into the position shown in Figure 1 so that the plate members 18 will extend in alinement. The nut member 15 is then tightened to maintain this adjusted position. By means of the bolt 19 it is obvious that the plate members 18 may be adjusted toward or from each other so that the down turned ends 20 thereof will be the proper distance apart, corresponding to the desired width of the expansion groove to be formed in the pavement or sidewalk. As soon as all adjustments necessary have been made, the device is laid upon the freshly cemented surface with the down-turned edges located at the expansion groove or joint and the device is then moved along, the plate members 18 acting to smooth off the surfaces of the cement at opposite sides of the joint in such a way that the height will be the same. It is of course quite apparent that the down-turned curved edges 20 will smooth off the edges of the joint itself.

In case it were simply desired to smooth off the edge of a strip or ribbon of cement or the like, it is not necessary to use both of the blade members or plates 18 and in this instance the nut 15 is loosened so that one arm 13 may be swung upwardly out of the way as shown in Figure 3, subsequently to which the nut 15 is tightened to maintain the desired position. When this is done it is obvious that when the device is laid upon the cement, only one plate 18 will engage thereon, the down turned edge 20 thereof bearing along the edge of the strip or ribbon and smoothing it off so that it will have the proper contour.

From the foregoing description and a study of the drawings it will be apparent that I have thus provided a simply constructed, inexpensive and very efficient tool for two purposes specified, the parts being so constructed and arranged that they may be shifted to convert the tool for one use or the other as the case may be. Owing to the simplicity of the construction and the fewness of the parts it is apparent that there is very little to get out of order so that the device should have a long and satisfactory life.

While I have shown and described the preferred embodiment of the invention, it should be undersood that I reserve the right to make such changes in the form, construction and arrangement of parts as will not depart from the spirit of the invention or the scope of the subjoined claims.

Having thus described the invention, I claim:

1. A tool of the character described, comprising a head having an extension, a pair of arms pivotally mounted upon said extension, means for clamping said arms in adjusted position, a handle member connected with the head, and plate members carried by said arms, the plate members having their adjacent edges spaced apart and down turned whereby to give the proper contour to the edges of an expansion joint.

2. A tool of the character described, comprising a head having an extension, a pair of arms pivotally mounted upon said extension, means for clamping said arms in adjusted position, a handle member connected with the head, and plate members carried by said arms, said arms terminating in attaching feet formed with slots, and securing bolts passing through said plate and said slots whereby the plates may be adjusted toward or from each other, said plates having their adjacent edges curved and down-turned.

3. A tool of the character described, comprising a head formed as a partial hollow sphere and having an enlarged portion and terminating in a reduced threaded shank, a pair of curved arms pivotally mounted upon said shank, a clamping nut on said extension for holding said arms in adjusted position, a handle including a socket member carrying a ball engaged within said head, and plates adjustably carried by said arms and having their adjacent edges curved toward each other whereby to give the proper contour to the edges of an expansion joint.

4. A tool of the character described, comprising a head formed as a partial hollow sphere and having an enlarged portion and terminating in a reduced threaded shank, a pair of curved arms pivotally mounted upon said shank, a clamping nut on said extension for holding said arms in adjusted position, a handle including a socket member carrying a ball engaged within said head, and plates adjustably carried by said arms and having their adjacent edges curved toward each other whereby to give the proper contour to the edges of an expansion joint, said arms being formed with laterally extending lugs cooperating with the edges of the arms whereby to limit pivotal movement of the arms in one direction.

In testimony whereof I affix my signature.

THORSTEN SWANSON.